United States Patent [19]

Panster et al.

[11] Patent Number: 5,721,016
[45] Date of Patent: Feb. 24, 1998

[54] PROCESS FOR THE TREATMENT OF MINERAL BUILDING MATERIALS

[75] Inventors: Peter Panster, Rodenbach; Thomas Goebel, Hanau; Stefan Wieland, Offenbach; Marion Langen, Werlte; Klaus Zinsmeister; Ute Werner, both of Loeningen; Christian Brandes, Hanover, all of Germany

[73] Assignee: Degussa Aktiengesellschaft, Frankfurt am Main, Germany

[21] Appl. No.: 650,347

[22] Filed: May 20, 1996

Related U.S. Application Data

[63] Continuation of Ser. No. 406,099, Mar. 16, 1995, abandoned.

[30] Foreign Application Priority Data

Mar. 17, 1994 [DE] Germany ............ 44 09 141.9

[51] Int. Cl.$^6$ ............ B05D 1/34; B05D 1/36
[52] U.S. Cl. ............ 427/387; 427/393.6; 427/407.1
[58] Field of Search ............ 427/387, 393.6, 427/407.1

[56] References Cited

U.S. PATENT DOCUMENTS

| | | | |
|---|---|---|---|
| 4,235,638 | 11/1980 | Beck et al. | 106/287.12 |
| 4,267,213 | 5/1981 | Beck et al. | 427/292 |
| 4,463,114 | 7/1984 | Balchunis et al. | 524/157 |
| 4,999,249 | 3/1991 | Deschler et al. | 428/447 |
| 5,380,791 | 1/1995 | Panster et al. | 524/837 |

FOREIGN PATENT DOCUMENTS

| | | |
|---|---|---|
| 0 340 816 | 11/1989 | European Pat. Off. |
| 672726 | 9/1995 | European Pat. Off. |
| 27 51 714 | 2/1989 | Germany |
| 773175 | 4/1957 | United Kingdom |

*Primary Examiner*—Erma Cameron
*Attorney, Agent, or Firm*—Beveridge, DeGrandi, Weilacher & Young, L.L.P.

[57] ABSTRACT

A process for the impregnating and priming treatment of mineral building materials of synthetic or natural origin using aqueous suspensions or solutions which contain at least one silicon-containing ion exchanger of the formula $$[(YO)_3Si(CH_2)_x]_nEX \quad (I)$$

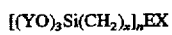

or an oligomer of this compound, wherein x signifies an integer of 1 to 12, n signifies an integer of 1 to 3, depending on E Y signifies H, Na, K, Mg, Ca, Ba E signifies a cation-exchanging or anion-exchanging group, and X signifies H$^+$ or an alkali cation or alkaline earth cation or OH$^-$ or an anion, in a quantity of from 0.1 to 70% by weight, particularly from 10 to 30% by weight, based on the total quantity of the solution or suspension, with the treatment being carried out in a single stage or in multiple stages, optionally combined with a treatment with aqueous or organic emulsions or solutions containing hydrolyzable silanes and/or siloxanes.

15 Claims, 4 Drawing Sheets

- x Silicone resin paint on salt - free stone
- ▣ Silicone resin paint primed with impregnating primer
- ◆ Silicone resin paint primed with ion exchangers and impregnating primer

- x Silicone resin paint on salt - free stone
- ▣ Silicone resin paint primed with impregnating primer
- ◆ Silicone resin paint primed with ion exchangers and impregnating primer

PROCESS FOR THE TREATMENT OF MINERAL BUILDING MATERIALS

This application is a continuation of application Ser. No. 08/406,099, filed Mar. 16, 1995, now abandoned, which application is entirely incorporated herein by reference.

INTRODUCTION AND BACKGROUND

The present invention relates to a process for the treatment of mineral building materials using impregnating agents which are particularly suitable for the prevention of saline deposits or efflorescence of salts. More particularly, the present invention relates to the protection of various natural and synthetic mineral building surfaces that are exposed to adverse environmental conditions.

Mineral building materials of both synthetic and natural origin are frequently provided with protective coatings for appearance reasons and/or for protection against the effects of the weather. These protective coatings are to some extent suitable for preventing the action of moisture and of pollutants from the outside. On the other hand, in many conventional systems a sealing effect develops which not only fails to prevent, but actually promotes, moisture-induced changes in the interior of the stone owing to moisture penetrating from below or from the reverse side or residual moisture contained therein, and the damage caused thereby. Well-known and dreaded are the saline deposits formed underneath the purported protective coating which lift the coating, causing it to flake off and within a short time ruin its protective effect and visual appearance. The agents responsible for such damage are on the one hand the salts penetrating the stone together with the moisture, for example via atmospheric pollutants or saline ground water, and on the other hand, salts which are dissolved by moisture out of the stone and salts released by chemical changes, which in like manner effloresce on the external surfaces of the stone and cause the coating to flake off.

A large number of patent applications relating to the impregnation of mineral materials with organosilicon compounds have been filed in the past. Hence, for example, alkyl trialkoxysilanes and aqueous emulsions containing condensation products thereof (German Patent 2 751 714), buffered silane emulsions (EP-A 0 340 816) or so-called microemulsions which contain the polysiloxanes (EP-A 0 279 623 corresponding to U.S. Pat. No. 4,842,766) have been suggested in the past.

However, impregnating agents resistant to efflorescence of salts have not as yet been found.

An object of the invention is to find a way for protecting synthetic or natural mineral building materials against the efflorescence of salts and the flaking off of coatings from the building material which frequently occurs as a result of efflorescence.

Another object is to prevent damage caused by salts such as alkali chlorides, alkali sulphates or alkali nitrates formed on the surface of building materials.

SUMMARY OF THE INVENTION

The above and other objects of the invention are achieved by the impregnating and priming treatment of mineral building materials with a silicon-containing ion exchange material.

In accordance with a more detailed aspect of the present invention the building materials treated can be of a mineral nature; either synthetic or naturally occurring, and can be in the form of blocks, panels or sheets, bricks and the like. One or more surfaces of such building materials may be treated in accordance with the invention.

To carry out the process of the invention the exposed surfaces of the building units are treated with aqueous suspensions or solutions which contain at least one silicon-containing ion exchanger of the formula

   (I)

or an oligomer of this compound, wherein x signifies an integer of 1 to 12, preferably 2 to 6, in particular 3, n signifies an integer of 1 to 3, depending on E Y signifies H, Na, K, Mg, Ca, Ba E signifies a cation-exchanging or anion-exchanging group, particularly $SO_3^-$ or ammonium, and X signifies $H^+$ or an alkali cation or alkaline earth cation or $OH^-$ or an anion, in a quantity of from 0.1 to 70% by weight, particularly from 5 to 30% by weight, based on the total quantity of the solution or suspension.

The treatment can be carried out in a single stage or in multiple stages, optionally combined with a treatment with aqueous or organic emulsions or solutions containing hydrolyzable silanes and/or siloxanes.

In a further aspect of the invention, the process is carried out with the silicon-containing ion exchanger of the above formula wherein EX denotes $SO_3H$ or a salt thereof and n equals 1. Preferably EX denotes $SO_3-1/2Ca^{2+}$.

A still further detail of the invention resides in using compounds wherein EX denotes $NR_{4-n}{}^+OH^-$, and R is respectively a straight chain, branched or cyclic alkyl group having 1 to 10 carbon atoms.

A preferred ion exchanger has the formula

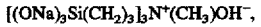

While the pH of the treating composition of the invention is not narrowly critical, the solution or suspension is adjusted to a pH value in the range of greater than 7.

It is also advantageous that the silicon-containing ion exchangers exchanging cations and anions and corresponding to formula (I) or oligomers of this combination be used simultaneously, separated or as a mixture. For example, the cation exchanger used can be $[(OH)_3Si(CH_2)_3]SO_3^-1/2Ca_2^+$ or $[(OH)_3Si(CH_2)_3]SO_3H$ and the anion exchanger used can be $[(ONa)_3Si(CH_2)_3]_3N^+(CH_3)OH^-$.

In the case of using a combination of cation exchangers and anion exchangers, they can be conveniently used in equal molar equivalent quantities.

As will be explained in greater detail hereinafter, subsequent to the treatment with the solution or suspension containing ion exchangers, a treatment using a water-repellent organic or aqueous solution or emulsion can be carried out with good results.

In this variation of the invention a topcoat is applied following the application of the solution containing the ion exchangers and the water-repellent layer.

BRIEF DESCRIPTION OF DRAWINGS

The present invention will be further understood with reference to the drawings, wherein.

Figure 1:
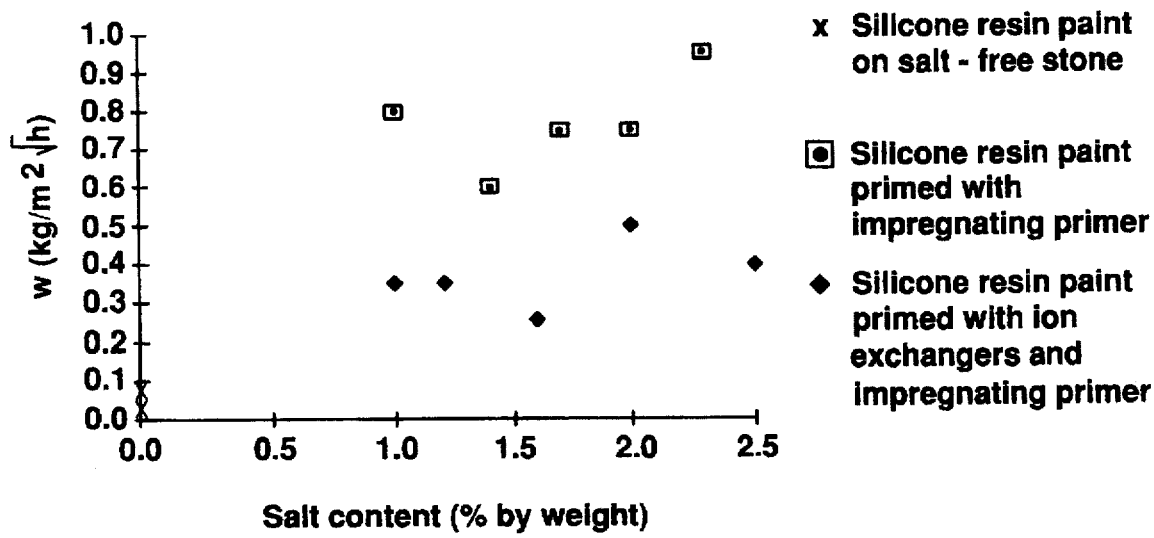
FIG. 1 shows a plot of water absorption coefficient and NaCl salt content of test sandstone.

A single-stage treatment with an emulsion or solution of the silicon-containing ion exchangers corresponding to formula (I) means that either a suspension or solution containing only anion exchangers or a suspension or solution containing only cation exchangers or a suspension or solution containing anion exchangers plus cation exchangers is used.

A multiple-stage treatment means the repeated application of a suspension or solution containing anion exchangers or cation exchangers or the successive application of a suspension or solution containing anion exchangers and of a suspension or solution containing cation exchangers or the repeated application of a suspension or solution containing both anion exchangers and cation exchangers.

Solutions and suspensions of the silicon-containing ion exchangers corresponding to formula I can be made by procedures known in the art.

In the case of a multiple-stage procedure, each treatment is usually followed by a drying phase during which there occurs a reaction of the silicon-containing ion exchanger with the building material and a condensation process, the latter being associated with the formation of a polysiloxane matrix. However, if the building material to be treated is a highly porous material, then this drying phase can be very brief or optionally dispensed with.

In the case of a multiple-stage procedure whereby the treatment is carried out with a suspension or solution containing cation exchangers and with a suspension or solution containing anion exchangers, the sequence can in principle be freely selected. However, the prior application of the suspension or solution containing anion exchangers; i.e. as the first coat in a multistage process has proven to be particularly successful.

In the ion exchangers used according to the invention, the integer x preferably has the value 2 to 6 and in particular the groups ethylene, trimethylene or tetramethylene are intended. Of these trimethylene is particularly preferred.

The cation-exchanging group EX is preferably the group $SO_3H$ or a salt thereof, particularly an alkali salt or alkaline-earth metal salt.

Compounds corresponding to formula I, like the oligomers to which, for example, the formula

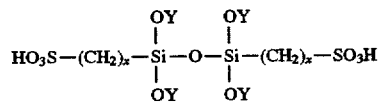

is generally ascribed, are known as ion exchangers in prior art, see for example German published application 4 142 129 corresponding to U.S. Pat. No. 5,380,791, which are relied on and incorporated herein.

It is apparent that the primers and impregnating agents according to the invention not only prevent or largely suppress the efflorescence of salts but also exhibit an effect extending beyond the ion-exchanging properties.

The combined use of anionic and cationic ion exchangers corresponding to the general formula I, or mixtures thereof, has proven to be particularly advantageous. In this variation of the invention, preferably approximately equal molar quantities of anion exchangers and cation exchangers are used. Slight deviations therefrom are not significant. In this case the calcium salt

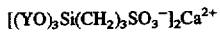

is particularly preferred.

Anion exchangers are preferably compounds having an ammonium group and corresponding to the formula

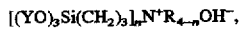

wherein R is a straight-chain, branched or cyclic alkyl group having 1 to 10 carbon atoms or is a corresponding aralkyl group. The alkyl groups of an ammonium group can be identical or different.

R is advantageously the methyl group, so that the preferred anion exchanger, with Y representing Na, corresponds to the formula

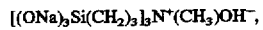

a compound which in the alkaline environment is readily stable in aqueous solution. Here it is advisable that the aqueous impregnating solutions have a pH value of greater than 7.

These compounds are prepared by reacting the solid compounds disclosed in DE-OS 3 120 195 (U.S. Pat. No. 4,410,669) and 3 800 564 (U.S. Pat. Nos. 5,130,396 and 5,239,033) with NaOH, which is also described in the parallel application P 44 09 140.0, all of which are relied on and incorporated by reference.

In addition to the monomeric compounds, oligomeric compounds corresponding to formula I, which arise through condensation of SiOH groups to form Si—O—Si groups, may also be present in the aqueous media depending on the concentration.

The aqueous primers and impregnating agents according to the invention contain the silicon-containing ion exchanger in a quantity suitably ranging from 0.1 to 70% by weight, preferably from 5 to 30% by weight. The said solutions or suspensions can be further diluted with water as required or else concentrated, but are as a rule directly usable at this concentration.

For the actual treatment of the building materials of the invention, conventional application techniques can be used such as brushing, spraying and the like.

The agents are applied to the surfaces to be treated in a conventional manner using conventional equipment for impregnation and priming and are left to adsorb, optionally with repeated application if a greater depth of penetration and a greater presence of ion exchanger is to be achieved in the material to be treated.

Particularly advantageous effects can be achieved if the treatment of the mineral building materials by the process according to the invention is combined with a treatment using water-repellent organic or aqueous solutions or emulsions which are known in principle from the prior art for the impregnation of building materials. The latter treatment preferably follows the treatment with the solution or suspension containing the ion exchangers of formula I, in a separate stage. For example, the building blocks can be first treated with the formula I ion exchangers and thereafter these can be treated with water repellant substances.

Conventional water-repellent solutions or emulsions can be used according to the above which contain, for example, hydrolyzable alkylalkoxysilanes in a proportion of from 1 to 60 parts by weight of the total quantity of applied materials in the separate step, both in monomeric and in condensed or partly condensed form.

The alkyl groups are generally $C_1$ to $C_{20}$ alkyl groups, while the alkoxy groups correspond to $C_1$ to $C_6$ alkoxy groups.

Silicate esters are also frequently used in the specified quantities given above for the water protecting agents.

The alkoxyfunctional silicone resins known per se for this application (DE-OS 3 323 908 corresponding to U.S. Pat. No. 4,582,874) or organo-alkoxypolysiloxanes (EP-A 0 015 366 and U.S. Pat. No. 4,281,147) or microemulsions known from EP-A 0 279 623 and U.S. Pat. No. 4,842,766 are also suitable for mixing with the ion exchangers employed according to the invention and for use, instead of or in combination with the alkylalkoxysilanes or silicate esters.

In principle it is also possible to mix these water-repellent solutions or emulsions with the solution or suspension of the silicon-containing ion exchanger prior to use and thus to combine in one stage the impregnation using the ion exchanger of formula I and the additional water-repellent impregnation using water-repellant substances.

A condition for this is however that, primarily on account of the pH value of the solution or suspension containing the ion exchangers, there is no spontaneous reaction, for example in the form of a polycondensation, with the water-repellent solution or emulsion. To this end additional buffer substances can be added and, if a two-phase system appears, emulsifiers can be added as well.

The process according to the invention for the impregnation and priming of mineral building materials, which is of course carried out at ambient temperature, that is, in general between 10° and 45° C., prepares the undersurface exceptionally well for the actual protective top coating, for example, using high-molecular silicone resin which is present in Funcosil® powder paint and in other paints.

Other products, for example, silicone emulsion paints, are of course also suitable for coating. A wide variety of conventional top coat materials, can be used according to the present invention over the impregnation coating with the ion exchangers of formula I.

The invention is explained in more detail by the appended experimental results of preferred embodiments.

Experimental Section

Use of ion exchangers on mineral undersurfaces contaminated with salts

To assess the efficiency of the ion exchangers, comparative investigations were conducted on test pieces of mineral building materials which were primed only with conventional primers and coated with paints. The capillary absorption of water in the surface of the test building materials in accordance with DIN 52617 and the bond strength of the resulting coating in accordance with ISO 4624-1978 (E) were used for quantification of the effects.

1. Materials 1.1 Undersurfaces

The laboratory tests were carried out using two different natural stone undersurfaces Oberkirchner sandstone Color: light yellow—light grey Constituents: predominantly quartz Particle bonding: silica-bonded Porosity: 17–19% by volume Water absorption coefficient of the untreated stone in accordance with DIN 52617:1.75 kg/$^2$√h Baumberger sandstone Color: light grey—light yellow Constituents: predominantly calcite, quartz (sand) proportion is low Particle bonding: lime-bonded Porosity: 15–18% by volume Water absorption coefficient of the untreated stone in accordance with DIN 52617:1.50 kg/$^2$√h 1.2 Impregnating and coating materials Anion exchanger Formula: $(CH_3)N[(CH_2)_3Si(OH)_3]_3{}^+OH^-$ System: aqueous siloxane solution Active group: methyltrialkylammonium Siloxane content: 0.5M Solution is 1.0M of NaOH, pH approx. 14

Cation exchanger

Formula: $(HO)_3Si(CH_2)_3SO_3{}^-H^+$

System: aqueous siloxane solution

Active group: sulphonic acid

Siloxane content: 0.5M, pH approx 0.3

Impregnating Primer

Suitable materials are the common low-molecular alkylalkoxysilanes which are suitable and well-known for impregnation and are commercially available in the form of solvent (alcohol)-containing solutions or in the form of aqueous emulsions.

Here Funcosil® impregnating primer was used, a reactive oligomeric siloxane solution for the water-repellent priming of mineral building materials.

Silicone Resin Emulsion Paints

The universally known paints based on high-molecular silicone resin and an organic binder can be used.

The paint used in the Examples was Funcosil® powder paint based on a high-molecular silicone resin, which is dispersed in water and then applied.

2. Preparation of test pieces

Test pieces of the dimensions 7×6×2 cm were prepared from the natural stones specified in Section 1.1 by sawing with a stone saw, dried to constant weight at 105° C. and subsequently weighed. They were then soaked in concentrated salt solutions (NaCl and $Na_2SO_4$ respectively) for a period of 24 hours and dried once more at 105° C. After drying, the intake of salt was determined by weighing and converted to percentage by mass. If necessary, encrustations of salt loosely attaching to the exterior of the test pieces were scraped off with a spatula prior to the application of the impregnating and coating materials.

The application of the substances specified in 1.2 was carried out under laboratory conditions, that is, at a temperature of from 20° to 22° C. and a relative atmospheric humidity of 30 to 50%.

For each variety of stone and type of salt taken up, at least 8 test pieces were coated on one side; of these at least 4 were treated with ion exchangers. All the substances were applied by means of a flat brush. The quantities applied were measured and converted to l/m$^2$ referred to the surface of the test piece.

The individual stages of the application were in the order described below:

a) test pieces treated with ion exchangers application of the anion exchanger, depending on the absorption capacity of the undersurface approx. 0.2 to 0.3 l/m$^2$ 3 hours drying time application of the cation exchanger, depending on the absorption capacity of the undersurface approx. 0.2 to 0.3 l/m²

3 hours drying time application of the Funcosil impregnating primer, depending on the absorption capacity of the undersurface approx. 0.2 to 0.4 l/m²

24 hours drying time first coat with Funcosil powder paint, application approx. 0.15 l/m²

24 hours drying time second coat with Funcosil powder paint, application approx. 0.15 l/m² b) test pieces treated without ion exchangers application of the Funcosil impregnating primer, depending on the absorption capacity of the undersurface approx. 0.4 to 0.6 l/m²

24 hours drying time first coat with Funcosil powder paint, approx. 0.15 l/m²

24 hours drying time second coat with Funcosil powder paint, approx. 0.15 l/m²

Prior to beginning the tests, the coated test pieces were stored for one week in an indoor atmosphere (20° to 22° C., 30 to 50% relative atmospheric humidity) and then weighed.

3. Testing methods and results 3.1 Capillary water absorption in accordance with DIN 52617

The capillary water absorption was determined in accordance with DIN 52617 under laboratory conditions (20° to 22° C., 30 to 50% relative atmospheric humidity). Epoxy resin was employed for lateral sealing of the test pieces. The suction test was carried out by storing the test pieces in a PE sponge saturated with water.

Figure 2:
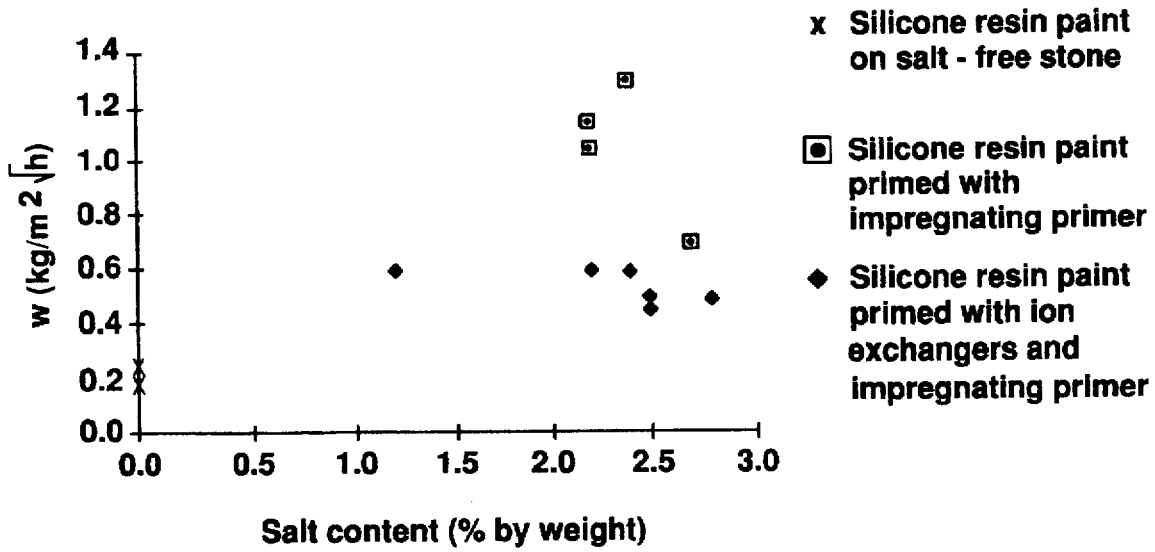
FIG. 2 shows a plot of water absorption coefficient and NaCl salt content for a different test specimen of sandstone.

The calculation of the water absorption coefficient (w values) was carried out in accordance with DIN 52617 Section with the data in kg/m²√h. The results of the test pieces charged with salt, with and without ion-exchange treatment, depending on the respective salt content can be seen in FIGS. 1 and 2 and in FIGS. 5 and 6. In addition the w values of salt-free test pieces coated with silicone resin emulsion paint are shown.

3.2 Bond strength in accordance with ISO 4624-1978 (E)

To investigate the bond strength, the same test pieces were used as were employed previously in Section 3.1. After completion of the capillary suction test, the test pieces were dried to constant weight at 50° C.

The tests were carried out using an instrument for determining bond strength from the firm Herion, Type HP 850, in accordance with ISO 4624-1978 (E), whereby stamps having a square area (5×5 cm) were bonded to the coating by means of a two-component adhesive and the test pieces were bonded with the underside on a steel plate. The rate of increase in strength during the test was 100 N/s.

The tensile force measured in KN was divided by the area of the test stamps, which produces the unit N/mm².

Figure 3:
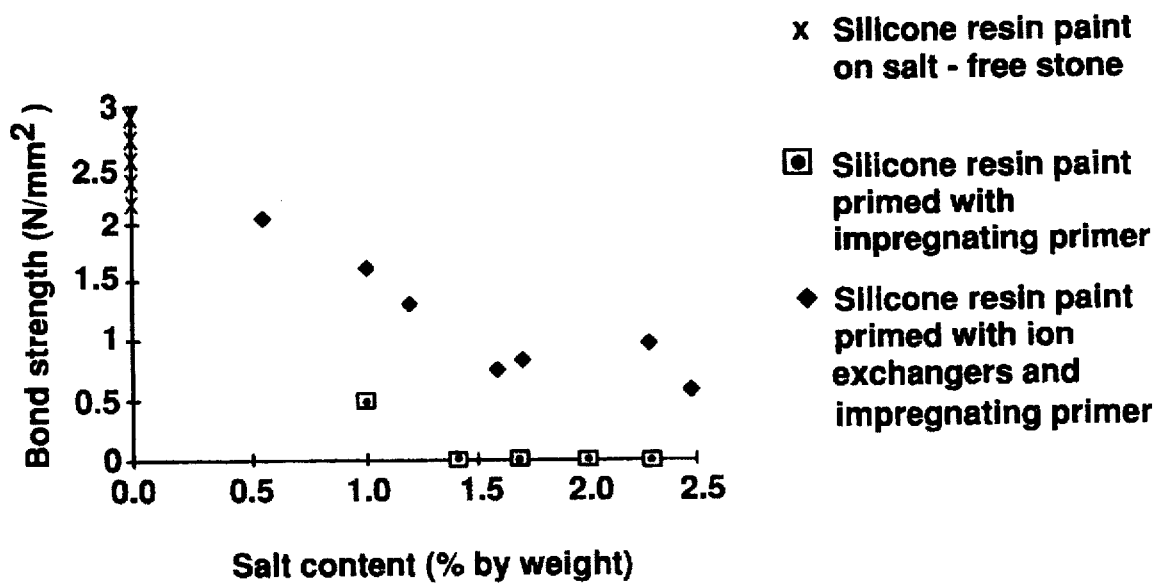
FIGS. 3 and 4 show plots of bond strength values and NaCl salt content for two different sandstone samples.
Figure 4:
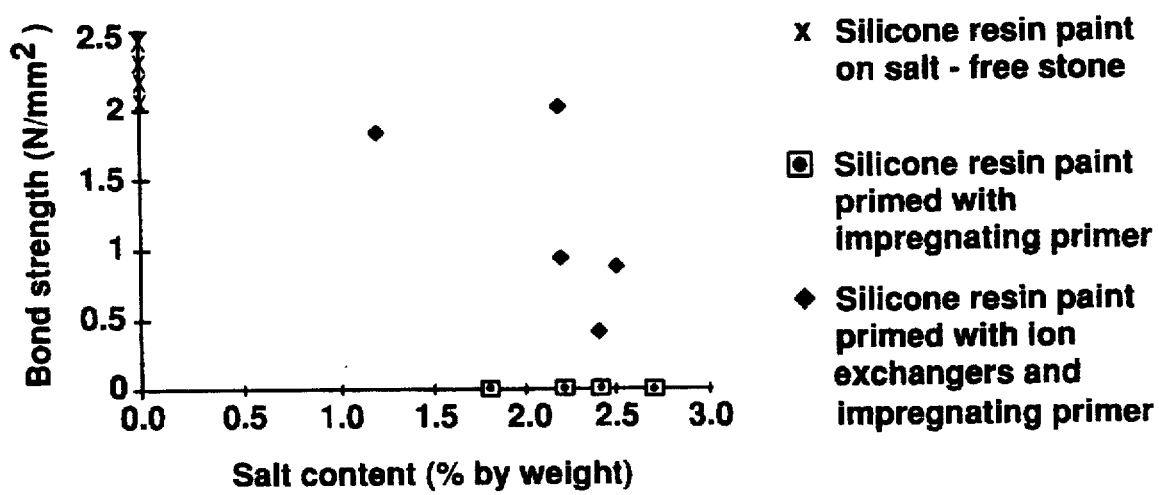
Figure 7:
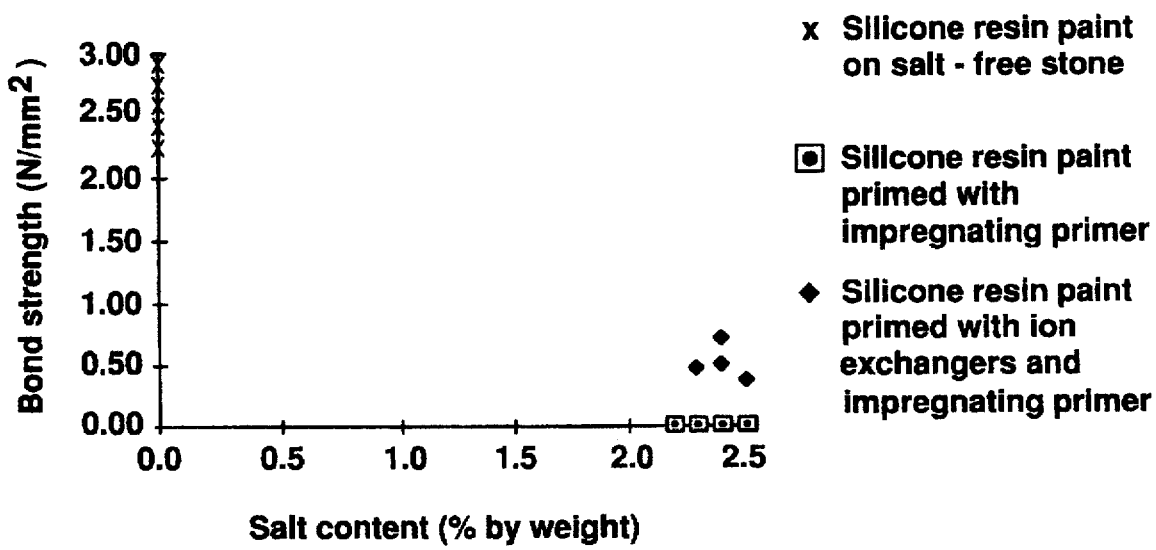
FIGS. 7 and 8 show plots of bond strength value and $Na_2SO_4$ salt content for two different sandstone samples.
Figure 8:
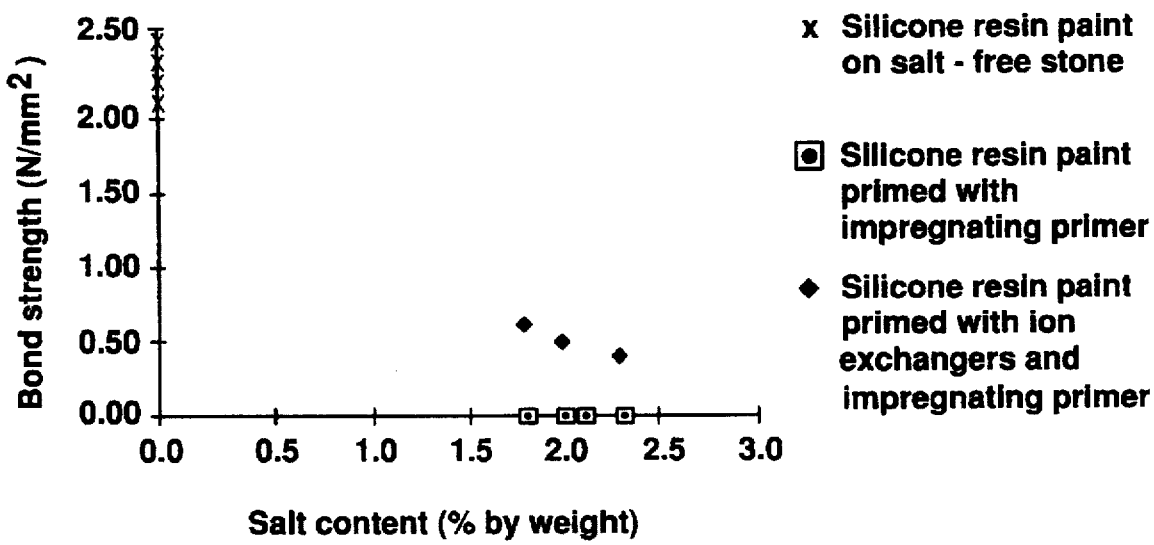

The results of the test pieces charged with salt, with and without ion-exchange treatment, depending on the respective salt content can be seen in FIGS. 3 and 4 and in FIGS. 7 and 8. In addition the bond strengths of salt-free test pieces coated with silicone resin emulsion paint are shown. The pattern of breakage arising from the test is characterized as follows: in principle, in all the test pieces charged with salt, breaks in adhesion were established at the interface of the coating and the undersurface. In the salt-free comparison test pieces the pattern of breakage was not uniform; breaks in cohesion within the coating or in the undersurface were observed in places as well as breaks in adhesion at the interface of the coating and the undersurface.

4. Discussion of the test results 4.1 Test pieces charged with NaCl

The capillary water absorption (FIGS. 1, 2) could be reduced by using the ion exchangers. In the Oberkirchner sandstone it was between 0.2 and 0.8 kg/m²√h, compared with which the water absorption without ion exchangers was from 0.6 to 1.0 kg/m²√h. In the Baumberger sandstone the w values of 0.6 to 1.3 kg/m²√h could be lowered to 0.4 to 0.6 kg/m²√h by using ion exchangers. The salt-free test pieces showed distinctly lower values compared with the test pieces charged with salt: 0.04 to 0.08 kg/m²√h in the Oberkirchner sandstone and 0.18 to 0.23 kg/m²√h in the Baumberger sandstone.

The bond strengths (FIGS. 3, 4) proved to be very unfavorable for the undersurfaces charged with salt and without ion exchangers: the coatings frequently flaked off after the capillary suction test and therefore appeared in the graph as 0 N/mm². The test pieces treated with ion exchangers, taking the salt content into consideration, showed relatively good values. The values for the Oberkirchner sandstone were between 0.5 and 2.0 N/mm² and for the Baumberger sandstone were in the range of from 0 to 2.0 N/mm². The salt-free test pieces showed values of from 2.5 to 2.9 N/mm² in the Oberkirchner sandstone and of 2.1 to 2.4 N/mm² in the Baumberger sandstone.

4.2 Test pieces charged with Na₂SO₄

Figure 5:
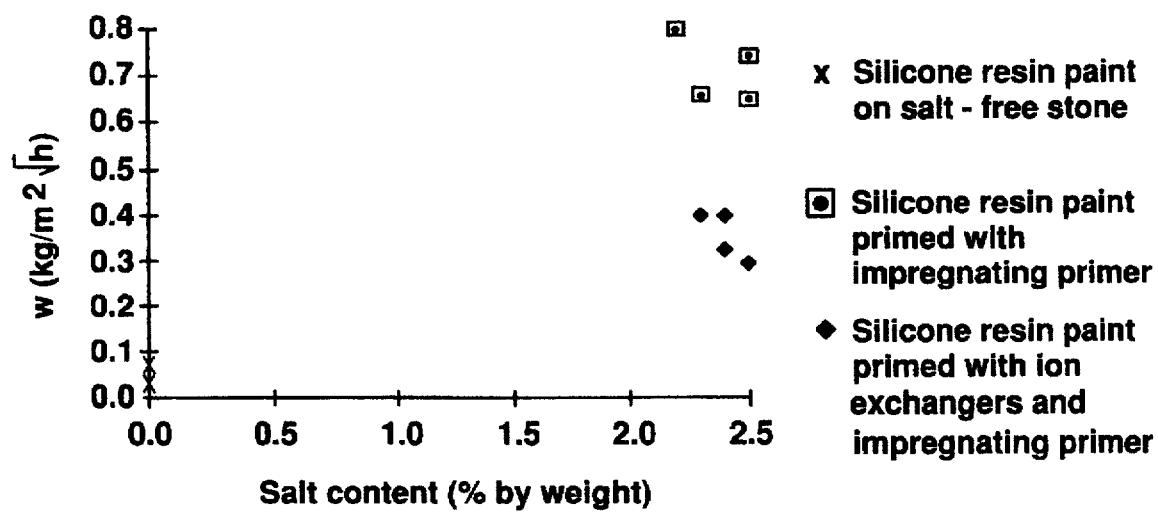
FIGS. 5 and 6 show plots of water absorption coefficient and $Na_2SO_4$ salt content for two different sandstone samples.
Figure 6:
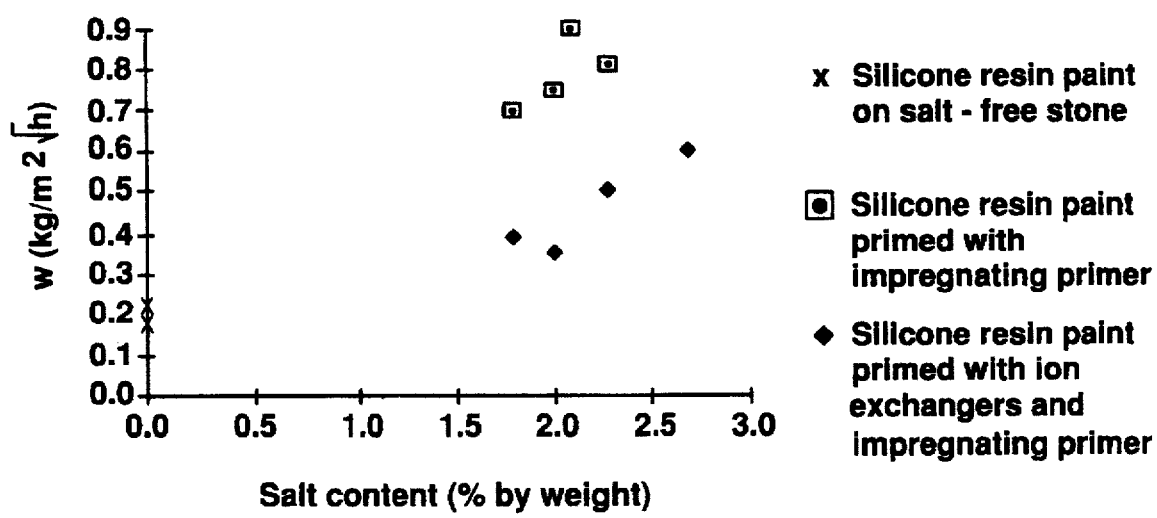

The results tended to be similar to the results for the test pieces charged with NaCl. The capillary water absorption was reduced on both undersurfaces through the use of the ion exchangers (FIGS. 5, 6). The bond strengths (FIGS. 7, 8) could be improved in so far as after the capillary suction test the coatings were still bonded firmly to the undersurface, whereas without ion exchangers the coatings always flaked off.

Nevertheless the values measured (0.4 to 0.6 N/mm² in the Oberkirchner sandstone and 0.3 to 0.7 N/mm² in the Baumberger sandstone) for the test pieces treated with ion exchangers are relatively low, which is probably attributable to the expansion occurring during the hydration of the Na₂SO₄ and the disintegrative effect associated therewith.

Further variations and modifications of the foregoing will be apparent to those skilled in the art and are intended to be encompassed by the claims appended hereto.

German priority application P 44 09 141.9 is relied on and incorporated herein by reference.

We claim:

1. A process for the priming and impregnating treatment of a mineral building material that is exposed to environmental conditions in order to prevent saline deposits and efflorescence of salts comprising applying to a porous surface of said mineral building material by impregnating said surface with:

(a) a treating material which is an aqueous suspension or solution containing a plurality of silicon-containing ion exchangers, each ion exchanger having the formula:

$$((YO_3)Si(CH_2)_x)_n \, EX \qquad (I)$$

or an oligomer compound thereof, wherein x signifies an integer of 1 to 12, n signifies an integer of 1 to 3, Y is a member selected from the group consisting of H, Na, K, Mg, Ca and Ba, E signifies a cation exchanging or anion exchanging group, there being at least one cation exchanging and at least one anion, exchanging group present in said treating material, and X signifies $H^+$ or an alkali cation or alkaline earth cation or an anion, and (b) an aqueous or organic emulsion or solution containing a hydrolyzable silane, siloxane or combination thereof, said aqueous suspension or solution in (a) being absorbed by said porous surface, reacting said ion exchanger with said mineral building material, condensing said ion exchanger to form a polysiloxane matrix thereon to thereby suppress efflorescence of salts caused by moisture.

2. The process according to claim 1 wherein said ion exchangers are applied in a quantity of from 0.1 to 70% by weight, based on the total quantity of the solution or suspension.

3. The process according to claim 1 wherein said ion exchangers are applied in a quantity of from 10 to 30% by weight based on the total quantity of the solution or suspension.

4. The process according to claim 1 wherein the said suspension or solution (a) is applied in a single impregnating treatment.

5. The process according to claim 1 wherein the said suspension or solution (a) is applied in a multiple impregnating treatment.

6. The process according to claim 1, wherein EX denotes $SO_3H$ or a salt thereof and n equals 1.

7. The process according to claim 1, wherein EX denotes $SO_3^- 1/2 Ca^{2+}$.

8. The process according to claim 1, wherein EX denotes $N^+R_{4-n}OH^-$, and R is respectively a straight chain, branched or cyclic alkyl group, each alkyl group having 1 to 10 carbon atoms, wherein n is an integer of 1 to 3.

9. The process according to claim 8, wherein the ion exchanger has the formula $((ONa)_3Si(CH_2)_3)_3N^+(CH_3)OH^-$.

10. The process according to claim 1, wherein the solution or suspension (a) is adjusted to a pH value in the range of greater than 7.

11. The process according to claim 1, wherein said treating material is applied in multiple treatment where at least one treatment contains an ion exchanger exchanging cations and at least one treatment contains an ion exchanger exchanging anions.

12. The process according to claim 1, wherein the cation exchanger used is $((OH)_3Si(CH_2)_3)SO_3^- 1/2Ca_2^+$ or $((OH)_3Si(CH_2)_3)SO_3H$ and the anion exchangers used is $((ONa)_3Si(CH_2)_3)_3N^+(CH_3OH^-$ 13. The process according to claim 1, wherein a cation exchanger and an anion exchanger are used in equal molar equivalent quantities in the treating material.

14. The process according to claim 1 further comprising after applying said solution or suspension (a) containing ion exchangers, applying said emulsion or solution (b) which is water-repellent to said building material.

15. The process according to claim 1 further comprising applying a topcoat to the building material following the application of the ion exchangers.

* * * * *